(12) United States Patent
Erickson et al.

(10) Patent No.: US 8,676,775 B2
(45) Date of Patent: Mar. 18, 2014

(54) SUPPORT 3-SCREEN USER EXPERIENCE IN THE CONTEXT OF A SERVICES MARKETPLACE

(75) Inventors: Richard Erickson, Farmingdale, NJ (US); Gilbert McGrath, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 643 days.

(21) Appl. No.: 12/334,018

(22) Filed: Dec. 12, 2008

(65) Prior Publication Data

US 2010/0153434 A1 Jun. 17, 2010

(51) Int. Cl.
*G06F 17/30* (2006.01)
(52) U.S. Cl.
USPC ............................................ 707/706; 706/10
(58) Field of Classification Search
USPC .................................. 707/628, 636, 770, 706
See application file for complete search history.

(56) References Cited

U.S. PATENT DOCUMENTS

2007/0244750 A1* 10/2007 Grannan et al. ................ 705/14
2008/0103795 A1* 5/2008 Jakubowski et al. ............ 705/1
2008/0117202 A1* 5/2008 Martinez et al. .............. 345/418

* cited by examiner

*Primary Examiner* — James Trujillo
*Assistant Examiner* — Dawaune Conyers
(74) *Attorney, Agent, or Firm* — Hoffmann & Baron, LLP (57) ABSTRACT

The present invention is directed to sharing access to end user information in a multi-screen environment for the purpose of enhancing application functionality and end user experience including advertising functionality and experience. The invention includes storing end user information obtained from a first screen environment in an end user context database (ECD), and accessing the end user information in the ECD for use in a second screen environment. The multi-screen environments include a television, a network access device, such as a personal computer configured to provide access to the Internet, a telephone and other mobile and home devices such as PDAs. The first screen environment is different from the second screen environment. Use of an application associated with any of the first and second screen environments by an end user generates an event with end user information, and includes publishing the event to the ECD and forwarding or making the event information usable by, or accessible to, other applications serving the end user, including advertising applications. The invention further controls access to the ECD by other applications serving the end user, including advertising applications. The end user information includes information about the end user's context, desires or preferences.

20 Claims, 12 Drawing Sheets

- APPLICATION CREATION ENVIRONMENT – ENABLES, EVENT TYPES, APPLICATION LATE BINDING FUNCTIONS, TEST/CERTIFICATION FACILITIES, SDKs AND LIBRARIES SUPPORTING APP CREATION.
- PRODUCT/OFFER CREATION ENVIRONMENT – PORTAL/WIZARD ENABLING PRODUCT MANAGERS TO BRAND AND CONFIGURE PRODUCTS & OFFERS FROM CARTS APPLICATION COMPONENTS.
- MANAGEMENT PORTAL – ARCHITECTURE FACILITAING THE INTEGRATION OF NEW OFFERS WITH CUSTOMER SELF-SERVICE PORTALS ON END USER DEVICES AND IN THE WEB.
- SERVICE METADATA – ARCHITECTURE SUPPORTING THE CAPTURE OF 3rd PARTY SERVICE METADATA TO FACILITATE TERGETED ADVERTISING AND THE LOOSE COUPLING OF APPLICATIONS ACROSS THREE SCREENS.

| EVENT FILTER QUADRUPLE ARRAY | | | | |
|---|---|---|---|---|
| FIELD LOCATION | FIELD | OPERATOR | VALUE | COMMENTS |
| EVENT HEADER | ELEMENT1 | > | 1 | ELEMENT FROM THE EVENT HEADER |
| FILTERABLE FIELDS | ELEMENT2 | <= | 3 | ELEMENT IN THE FILTERABLE FIELD |
| JSON BODY | Root.child.element3 | != | "NJ" | ELEMENT SPECIFIED USING AN JAVASCRIPT EXPRESSION |
| XML BODY | /root/child/element4 | == | "GE" | ELEMENT SPECIFIED USING AN XPATH EXPRESSION |
| PROFILE DATABASE | SELECT element5 FROM TABLE WHERE id=9 | > | 0 | ELEMENT SPECIFIED USING A SQL QUERY |

SUPPORT 3-SCREEN USER EXPERIENCE IN THE CONTEXT OF A SERVICES MARKETPLACE

BACKGROUND OF THE INVENTION

1. Field of the Invention

The present invention generally relates to a method for loosely coupling applications serving the many screens of an end user's experience, including what at present are the three primary screens of television, mobile devices and PCs. The method couples such applications via an event database which captures events about an end user's context, sent from those applications, in an event database, which may then be searched by advertising or other applications to acquire information about usage and customer context and tailor application behavior, including advertising, to a specific end user.

2. Brief Description of the Related Art

A significant number of individuals currently possess many devices through which they experience application functionality including advertising. These devices include, for example television, PCs, and mobile devices. Much of the advertising encountered by end users of these devices is Product specific, not necessarily end user specific. Furthermore, many advertising methods currently employed by these devices are ineffective because they cannot adequately target the end user audience.

Applications that understand the current context of the end user can deliver better functionality to those end users. Increasingly, end users interact with multiple applications via different screens simultaneously (e.g., they do Internet searches while watching television and take phone calls as they occur). To deliver functionality effectively, applications need to understand how other applications are affecting the end user context. It is very difficult and complex to establish direct linkages between applications for the purposes of context sharing. A better, more loosely coupled mechanism is needed to exchange such context information.

Developers around the world are creating Internet applications at an unprecedented rate (thousands of applications per month). For the mass market, these applications are largely free to end users. Advertising provides most of the support for the mass market Internet applications ecosystem. The ability to place ads is based on an understanding of the end user. Applications learn information about their end-users as they deliver their functionality (e.g., a Restaurant Finder application learns their food preferences). Collectively, the end-user information gathered by applications is of great value to advertisers and can be monetized through an advertising value chain, but it is not always possible or desirable to advertise to an end user in association with the application that gathered data about that end user or at the time that information was collected. (For example, it might not be desirable to advertise to an end user who is using a Restaurant Finder application on a mobile device because of the device's small screen. Furthermore, it might be desirable to place an ad to that end user for a particular type of restaurant at a later time, when the end user is watching TV, based on the information the mobile Restaurant Finder application gathered).

SUMMARY OF THE INVENTION

Embodiments of the present invention are direction to a method, system, and tangible computer readable carrier for sharing access to end user information in a multi-screen environment.

A method of sharing access to end user information in a multi-screen environment in accordance with the present invention, which incorporates some of the preferred features, includes storing end user information obtained from a first screen environment in an end user context database (ECD) and accessing the end user information from the ECD for use in a second screen environment.

The method may include a first screen environment and a second screen environment, which may be one of a television, a network access device, and a telephone. The network access device may include a personal computer configured to provide access to the Internet as well as other mobile and home based devices such as PDAs.

The method may contain an application, associated with any of the many screen environments or devices associated with an end user, which generates an event. The method of the present invention further includes publishing the event to the ECD, and forwarding the event to other applications serving the end user. The method of the present invention further includes controlling access to the ECD by other applications serving the end user, including advertising applications. The end user information of the method includes information about the end user's context, desires or preferences.

A computer-readable medium in accordance with the present invention, which incorporates some of the preferred features, includes instructions, wherein execution of the instructions by at least one computing device enables sharing access to end user information in a multi-screen environment in accordance with the above methods.

A system configured to share access to end user information in a multi-screen environment including a computing device configured to store end user information obtained from a first screen environment in an ECD, the computing device configured to allow access to the end user information in the ECD from a second screen environment, in accordance with the above methods.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE EMBODIMENTS

The present invention includes a method for linking applications including advertising applications to the many screens of an end user's experience, including what at present are the three primary screens of television, mobile devices and PCs, reporting end user information to a database which may then be used by other applications, including advertising applications to acquire information about end users for the purpose of enhancing application functionality and end user experience, including advertising relevance to a specific end user.

The linking of advertising applications to an end user's multi-screen environment is facilitated by an end user context database (ECD). Application creators can be subcategorized into 3-screen service providers and creators from other sources, such as Internet application creators. Applications (Apps) can be a service feature offered by a service provider. Apps can also be downloaded or subscribed to from other sources. Apps can also be end user generated. Apps can be, for example, a search engine on a computer or text messaging features on a phone.

An example of an embodiment of the present invention is an advertisement is delivered in a first screen environment, such as the television, based on information that is collected from applications that are running in a second screen environment, the network access device or the telephone. In the prior art an advertisement would be delivered through the device screen used by a service, the service also providing user context for the advertisement. So in this example, where a broadband television service is delivered through a television device, advertisements in prior art would be delivered through the television device based on context provided by the broadband television service which might include a description of the television content being watched, along with the time of day and region of the country. In the present invention, the advertisement selected for delivery through one device screen is based on context information gathered, in the past or at present, from multiple services delivered through the same or other device screens. So in this example, the advertisement selected for delivery through the television device in conjunction with the broadband television service is based in part on context information acquired from the Internet Search service running on the laptop device. The first screen environment and the second screen environment can be any of the many screens of an end user, and the second screen can be different than the first screen. For example, the first screen environment can include a television and the second screen environment can include a network access device, such as a personal computer coupled to the Internet, or a telephone.

Apps are loosely coupled through an end user context database (ECD) i.e., no direct app-to-app integrations are required. This is facilitated by source apps registering and committing to publish service marketplace events, which other consuming apps can learn about in an event repository and subsequently look for at runtime in the ECD. A push mechanism can also be established via an event broker to directly push certain events to registered subscribers, or they can be accessed via a pull operation at runtime on the ECD for a particular end user ID. In general, apps benefit by participating because it enhances their functionality and end user experience. For example, a set top box might subscribe to events that advance the channel up or down so that other devices, such as cell phones, could control the TV by simply generating those events. By participating in the services marketplace and publishing events to the ECD, this behavior is possible.

The ECD is a repository for end user context information for applications running behind the many screens of the end user's environment. The ECD can organize the information in any manner. In the preferred embodiment the ECD organizes information based on end user ID.

Application creators, or others who subscribe to the database, can mine the information present in the database. The information can be used to generate end user specific application services, end user specific advertising, etc.

The figures show an AT&T architecture referred to as CARTS (Common Architecture for Real-Time Services), which is intended to be an example without limiting the scope of the present invention in any way. SCDF is a component of the larger CARTS architecture. CARTS and SCDF include embodiments of the ECD referred to as the CCD (Customer Context DB) and CKD (Customer Keyword DB) and the figures include these references. It is to be understood that reference to any of the ECD, CCD, or CKD is equally applicable to any other of the ECD, CCD, or CKD.

Figure 1:
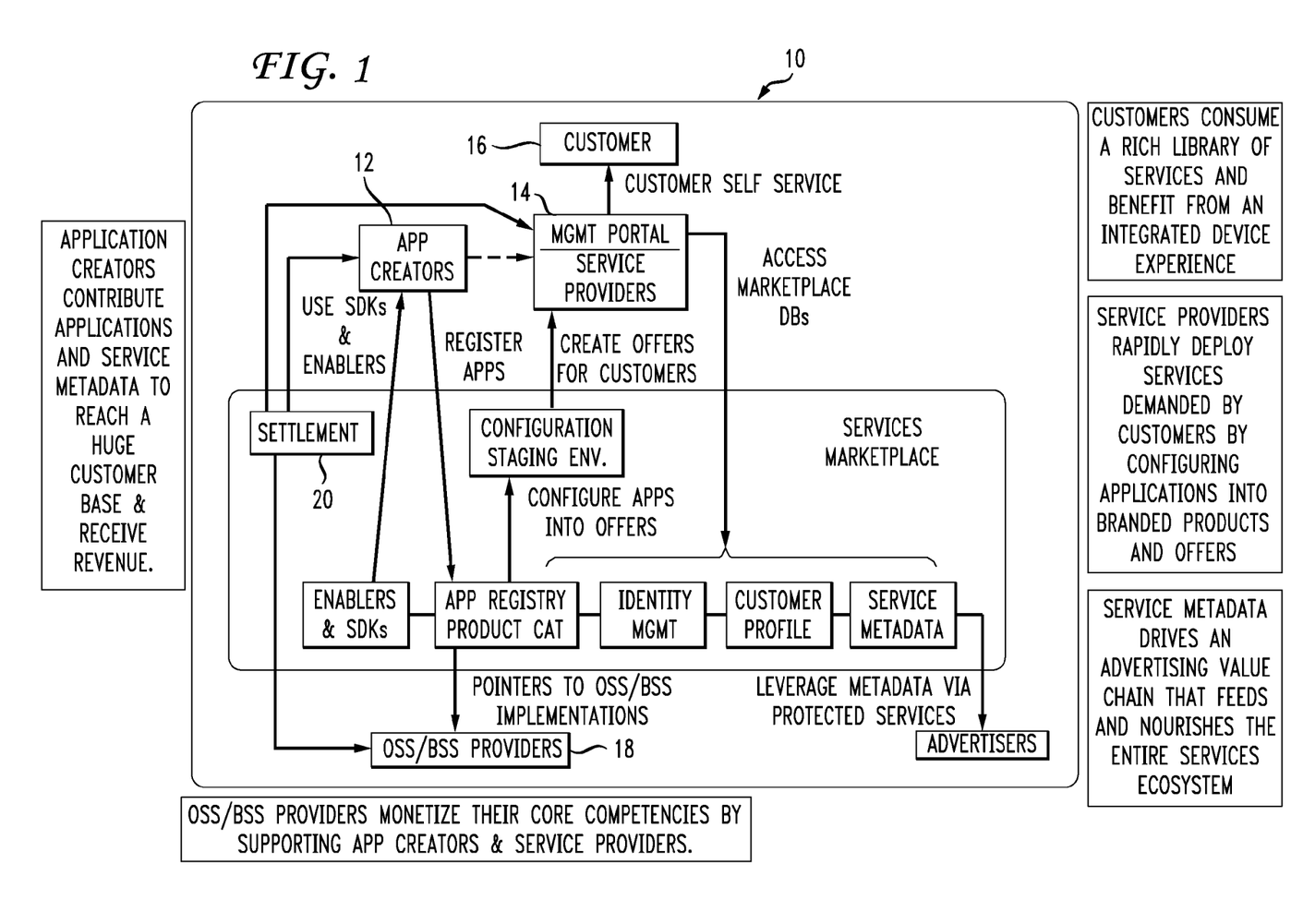
FIG. 1 is a block diagram of a Service Creation and Delivery Framework (SCDF) architecture in accordance with the present invention.

As depicted in FIG. 1, the sharing of application context is likely to occur in services marketplace of some sort.

Most service based advertising strategies seek ways to place ads in conjunction with the delivery of services. However, the EDB enables the acquisition of service metadata to be disconnected from the delivery of advertising.

Every app generates some valuable meta information about end user context (e.g., a Restaurant Finder mobile app may learn that an end user likes 'Thai Food'). By collecting data from many apps, the EDB can amass a great deal of end user metadata, which can be used to support targeted advertising or to deliver other applications more effectively to end users. The data of the app creators is more valuable in combination. The data from the Restaurant Finder may ultimately drive broadcast TV advertisements via a set top box, i.e., drive advertisements in a totally different context from where the data was acquired.

A major theme of the SCDF is support for application creation. Among the support SCDF can provide:

1) A library of enablers providing access to reusable network and OSS/BSS functions such as the ECD. These enablers are available to any application that agrees to required terms and conditions.

Figure 2:
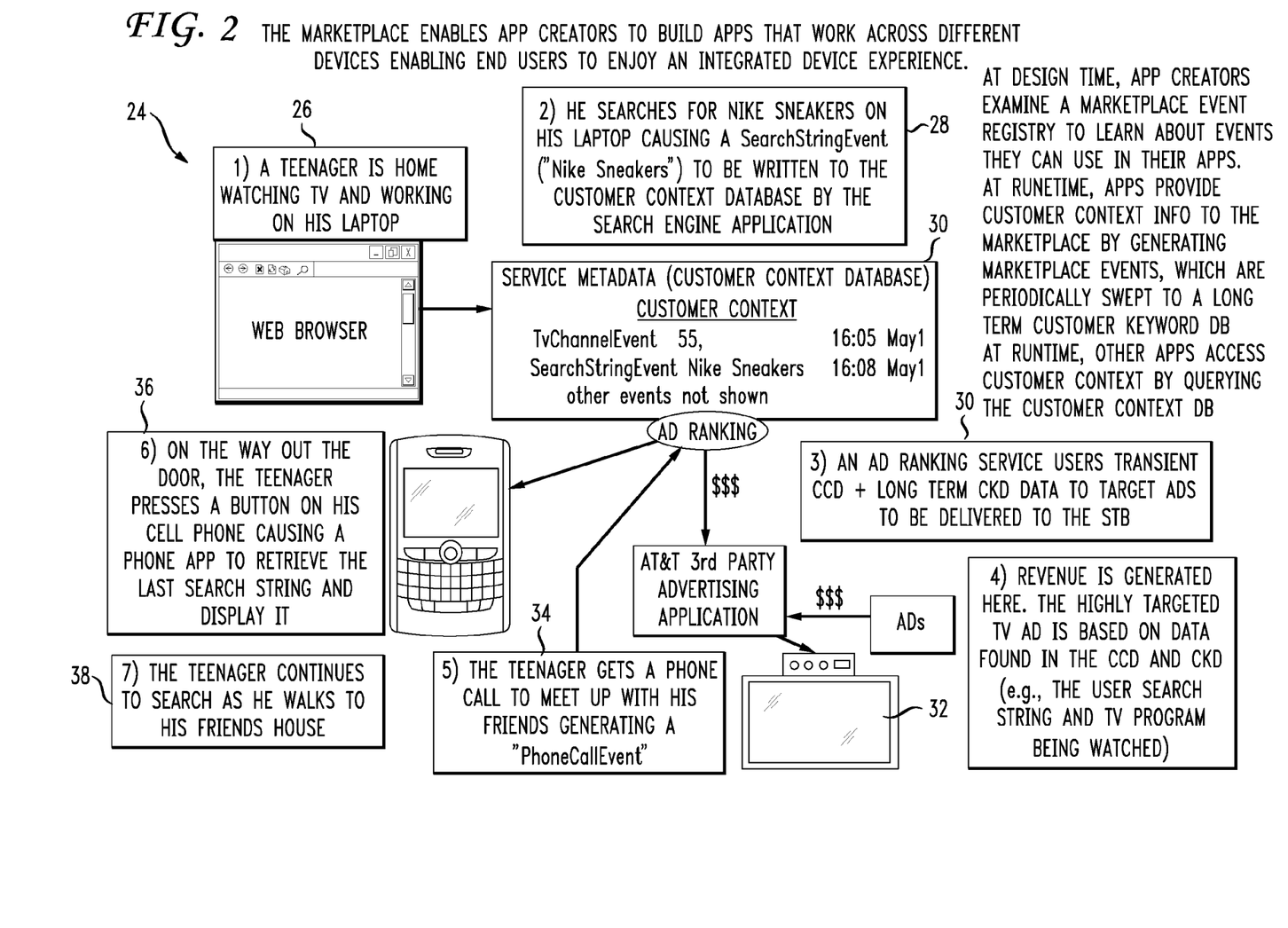
FIG. 2 is a block diagram of an integrated device experience scenario showing how applications serving an end user are loosely coupled through an end user context DB depicted as a customer context DB.

2) A library of registered Marketplace Events which may be sent to and received from the End user Context Database. As depicted in FIG. 2, the use of Marketplace Events 24 enables applications to provide an integrated three-screen experience by facilitating loose coupling with other applications operating in the end user's three-screen (computer, TV and mobile screen) environment.

The block diagram in FIG. 2 depicts a potential scenario for how the three screen environment works. First, a teenager is home watching TV and working on his laptop, 26. Then the teenager searches for Nike® Sneakers on his laptop causing a SearchStringEvent ('Nike® Sneakers') to be written to the Customer Context Database (CCD) by the Search Engine Application, 28. An ad ranking service then uses transient CCD and longer term Customer Keyboard DB (CKD) data to target ads to be delivered to the Set Top Box (STB), 30. Revenue is generated by the highly targeted TV ad that is based on data found in the CCD and CKD (e.g., the end user search string and TV program being watched), 32. The teenager then gets a phone call to meet up with his friends generating a PhoneCallEvent, 34. On the way out the door, the teenager presses a button on his cell phone, causing a phone app to retrieve the last search string and display it, 36. The teenager then continues to search as he walks to his friend's house, 38.

Figure 3:
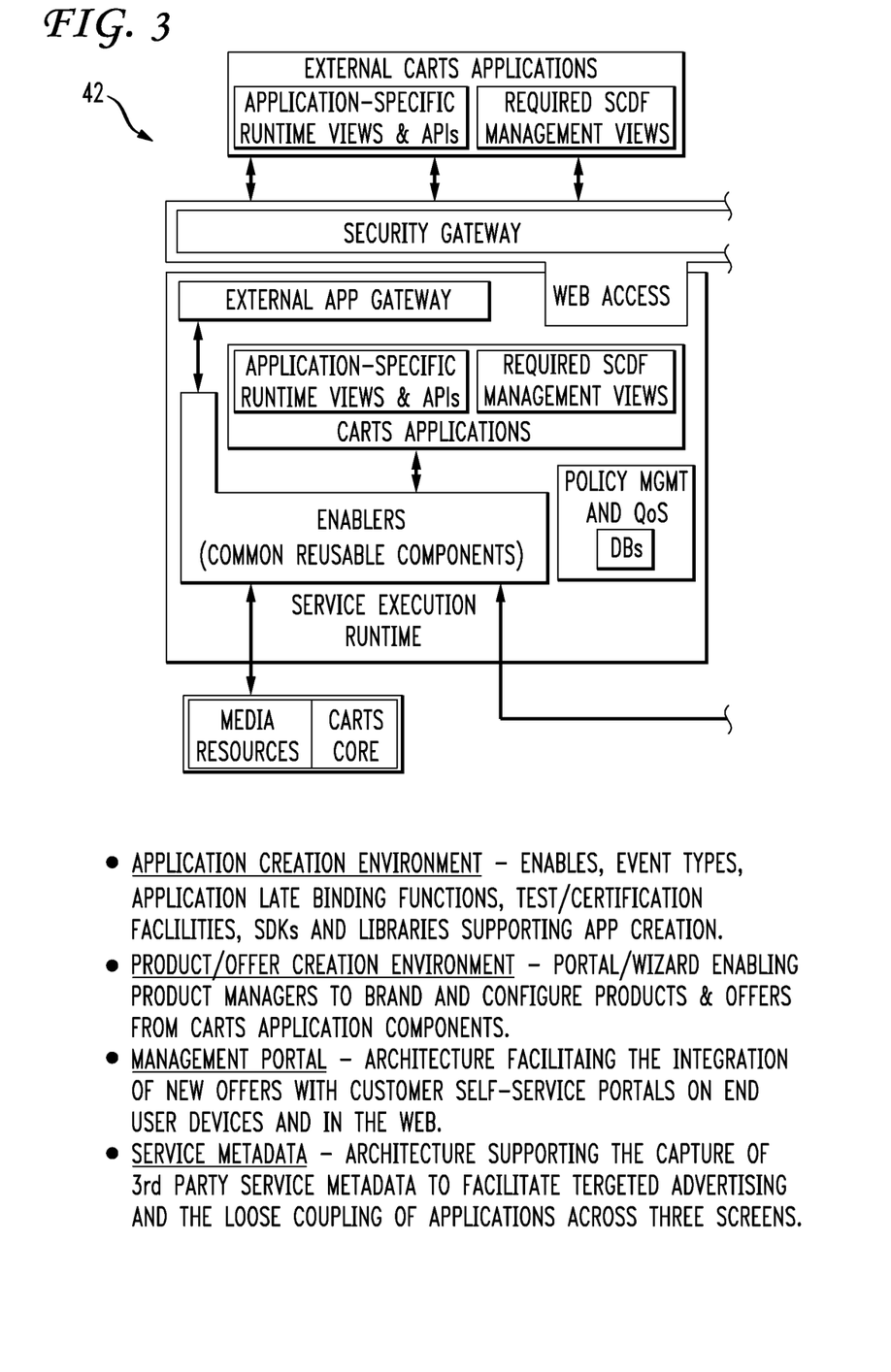
FIG. 3 is a block diagram of a high level SCDF architecture.

As depicted in FIG. 3, the SCDF Architecture 42 consists of five broad elements:

1) Application Architecture for Common Architecture for Real-Time Services (CARTS) Applications.

2) Application Creation Environment, facilitating the creation of CARTS Applications.

3) Product Offer Creation Environment, enabling internal and external Product managers to configure Products and Offers from CARTS Applications registered in a Services Marketplace.

4) Management Portal architecture facilitating the integration of new Offers with end user self-service portals on end user devices and in the Web.

5) Service Metadata architecture supporting the capture of third party service metadata to facilitate targeted advertising and the loose coupling of applications across three screens.

Figure 4:
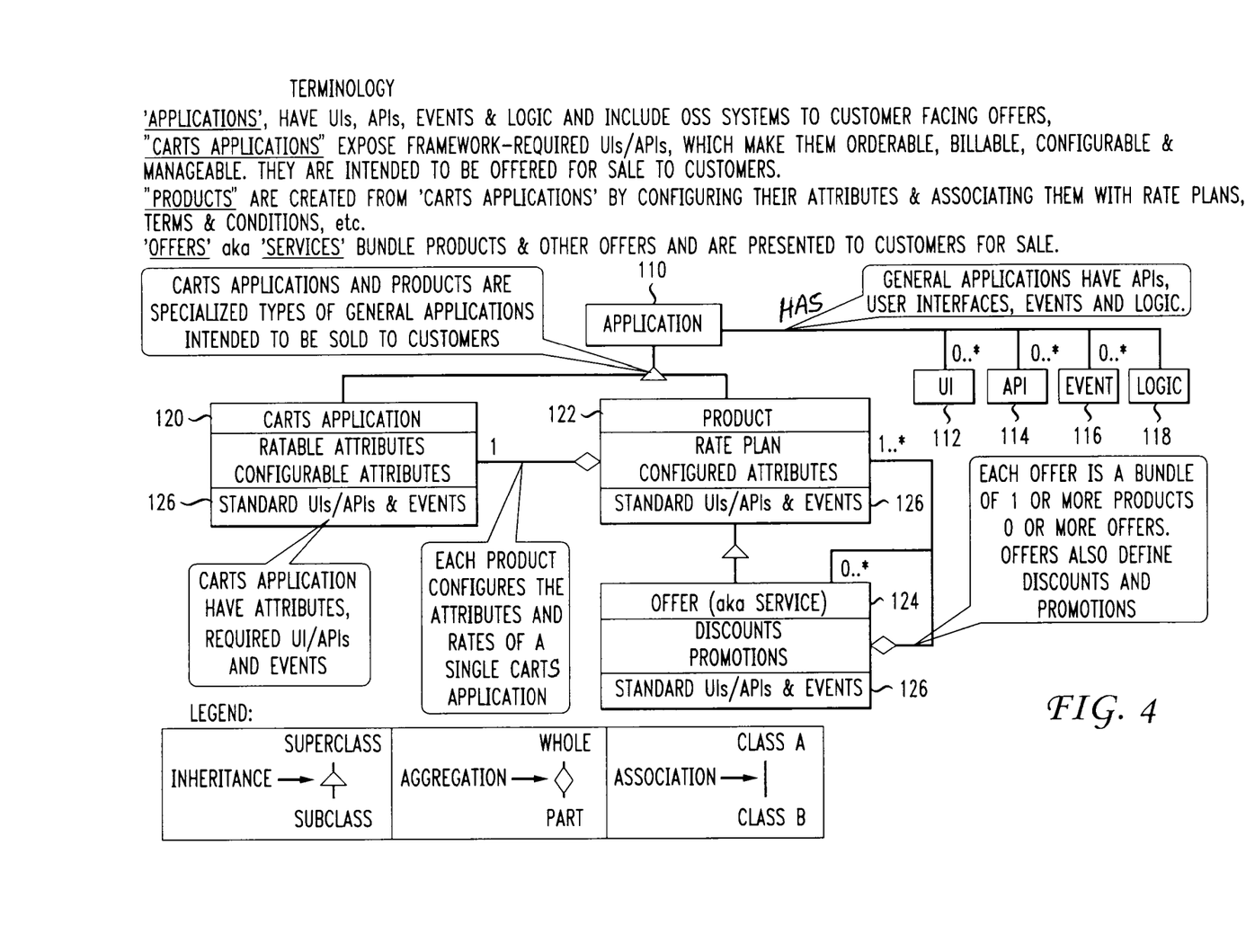
FIG. 4 is a block diagram defining a set of terms. Products are derived from Common Architecture for Real-Time Services (CARTS) applications and Offers are bundles of one or more Products and other Offers.

FIG. 4 shows the relationship between applications, CARTS, Products, and Offers (also known as services). Applications 110 preferably include GUIs 112, APIs 114, events 116, and logic 118. CARTS 120 are a subclass of applications 110, and expose framework-required GUIs, APIs, events, and functions which are orderable, billable, configurable, and manageable. Manageable functions are those that can be modified, cancelled, and added. Products 122 are preferably created from one CARTS application 120 by configuring the CARTS's attributes and associating them with rate plans, terms and conditions, and the like. Offers, or services, 124 preferably bundle Products with other Offers and associated discounts and promotions with the bundle. Offers are presented to end users (also known as subscribers). The CARTS 120, Product 122, and Offer 124 all preferably make use of standard GUIs, APIs, and events 126.

Figure 5:
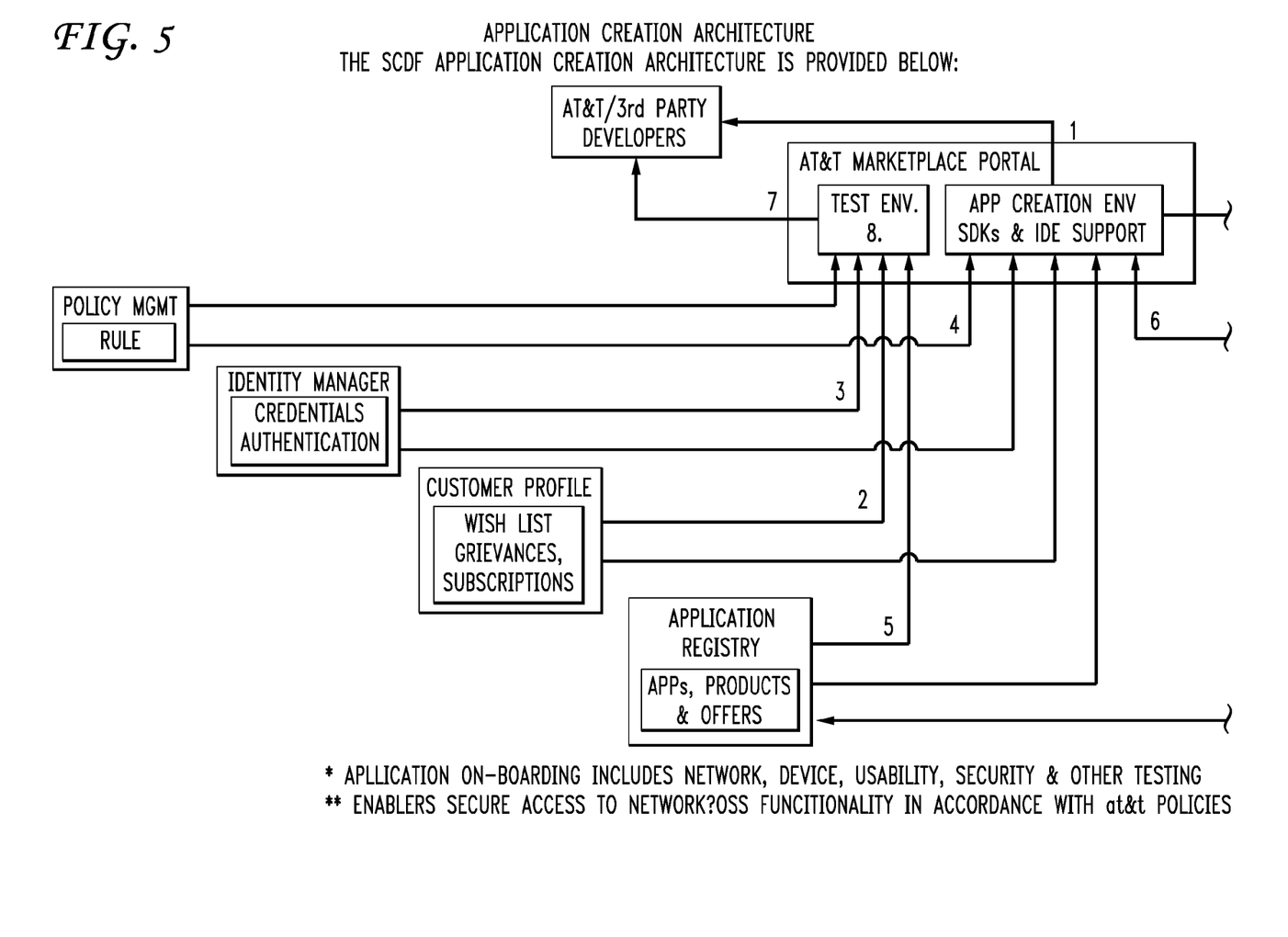
FIG. 5 is a block diagram of an application creation architecture.

FIG. 5 shows one embodiment of an Application Creation environment that leverages event types and customer context information to support the creation and deployment of service applications.

Figure 6:
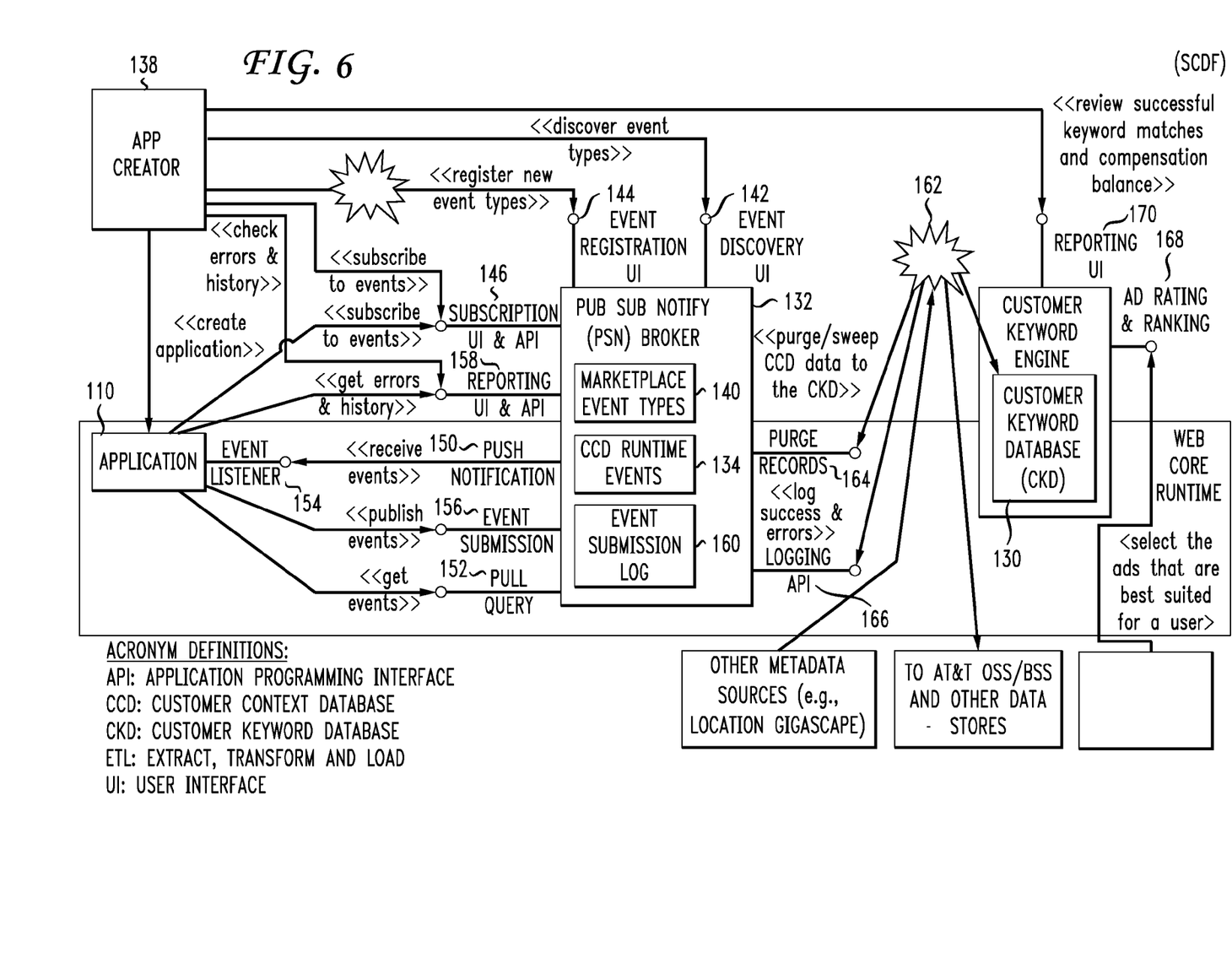
FIG. 6 is a block diagram of a service metadata context diagram.

The Monetization of Service Metadata strategy depends on the Customer Keyword Database (CKD) 130 of SCDF, as well as the Publish Subscribe Notify (PSN) 132 and Customer Context Database (CCD) 134 components, whose design time aspects are considered part of SCDF, as depicted in FIG. 6. The Service Metadata context diagram in FIG. 6 shows an Application Creator 138 creating an application 110 that sends and receives Marketplace Events 140 to and from the CCD 134, via the PSN Broker 132. These Marketplace Events may be used to design an application that provides an integrated device experience, or to send service metadata into the Marketplace for monetization through an advertising value chain and eventual compensation to the Application Creator. Some of the steps the Application Creator goes through to send and receive Marketplace Events are described below:

The Application Creator 138 discovers which Marketplace Events have been registered using the Discovery User Interface (UI) 142 of the PSN which provides access to the database of Marketplace Event Types. Only registered Event Types may be subscribed to or sent to the CCD, via the PSN.

If necessary, to meet the needs of the Application being designed, the Application Creator may register a new Marketplace Event Type using the Registration UI 144 and Process.

Next, the Application Creator can subscribe to selected Marketplace Events using the PSN's Subscription UI and API 146.

The Application Creator can design the Application to either receive pushed delivery of Marketplace Events, via the Push Notification interface 150 of the PSN, or to hold events for pull/query via the Pull/Query interface 152.

If push delivery of subscriptions is desired, the Application Creator must implement the Marketplace Event Listener 154, which is a service that listens for, and can receive any Marketplace Event (although specific implementations must be provided to process each Event Type received through the interface).

The Application may also generate registered Marketplace Events and send them to the CCD via the Event Submission interface 156 of the PSN.

The Application Creator or Application may desire to check on the success or failure of event submission and delivery by consulting the Reporting UI and APIs 158, which provide controlled access to the PSN's Event Submission Log 160.

Events in the CCD are intended to be transient and are periodically purged by an Extract Transform and Load (ETL) process 162 into persistent storage in the Customer Keyword Database 130 (and as needed to other persistent data stores). As they are swept from the CCD via the PSN's Purge Records interface 164, they are combined with information gathered from other metadata sources and retained within the CKD as Keywords associated with customer identities.

As part of the ETL processing, successes and failures are logged with the PSN's Logging interface 166, where they may be subsequently accessed via the PSN's Reporting UI and APIs.

Multiple customer keywords may be generated from a particular Marketplace Event published to the CCD. Keywords are organized in a taxonomy and are associated with metadata that includes the source(s) of the metadata, as well as the age, frequency and consistency of the data. This keyword metadata is taken into account when keywords are used to select ads via the CKD's Ad Ranking and Rating service 168.

Application Creators may learn of their accumulated or pending compensation via the CKD's Reporting UI 170.

Figure 7:
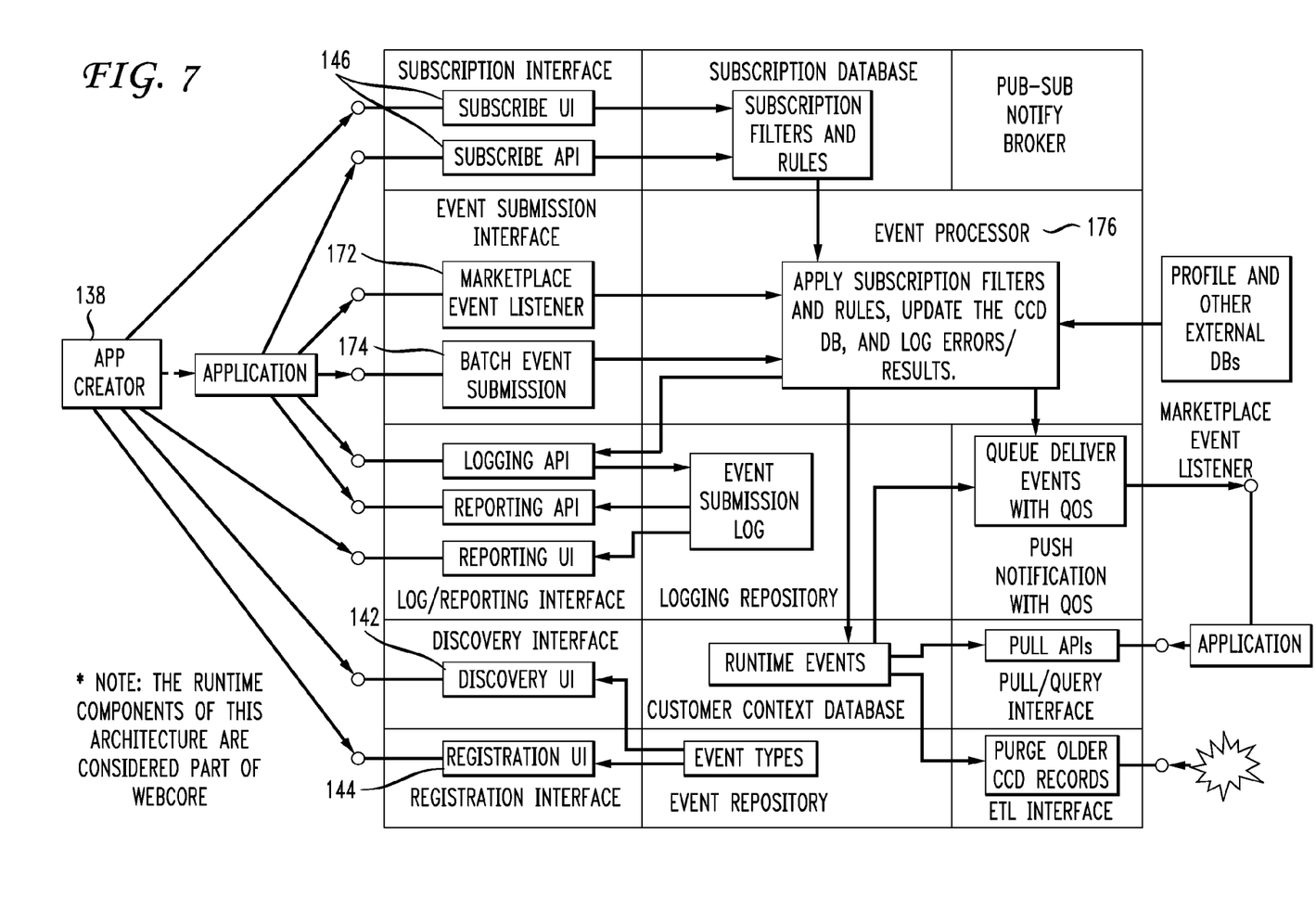
FIG. 7 is a block diagram of a publish subscribe broker architecture.

In FIG. 7 the architecture of the PSN Broker is depicted. Applications may submit events individually, via the Marketplace Event Listener interface 172, or in batch, via the Batch Event Submission interface 174. Subscriptions may be established subject to rule based filters which can operate both on the consent of specific events and the values established in the Customer Profile and potentially other external databases. An Event Processor 176 applies subscriptions rules, updates the CCD, queues events for delivery and logs errors and results.

Figure 8:
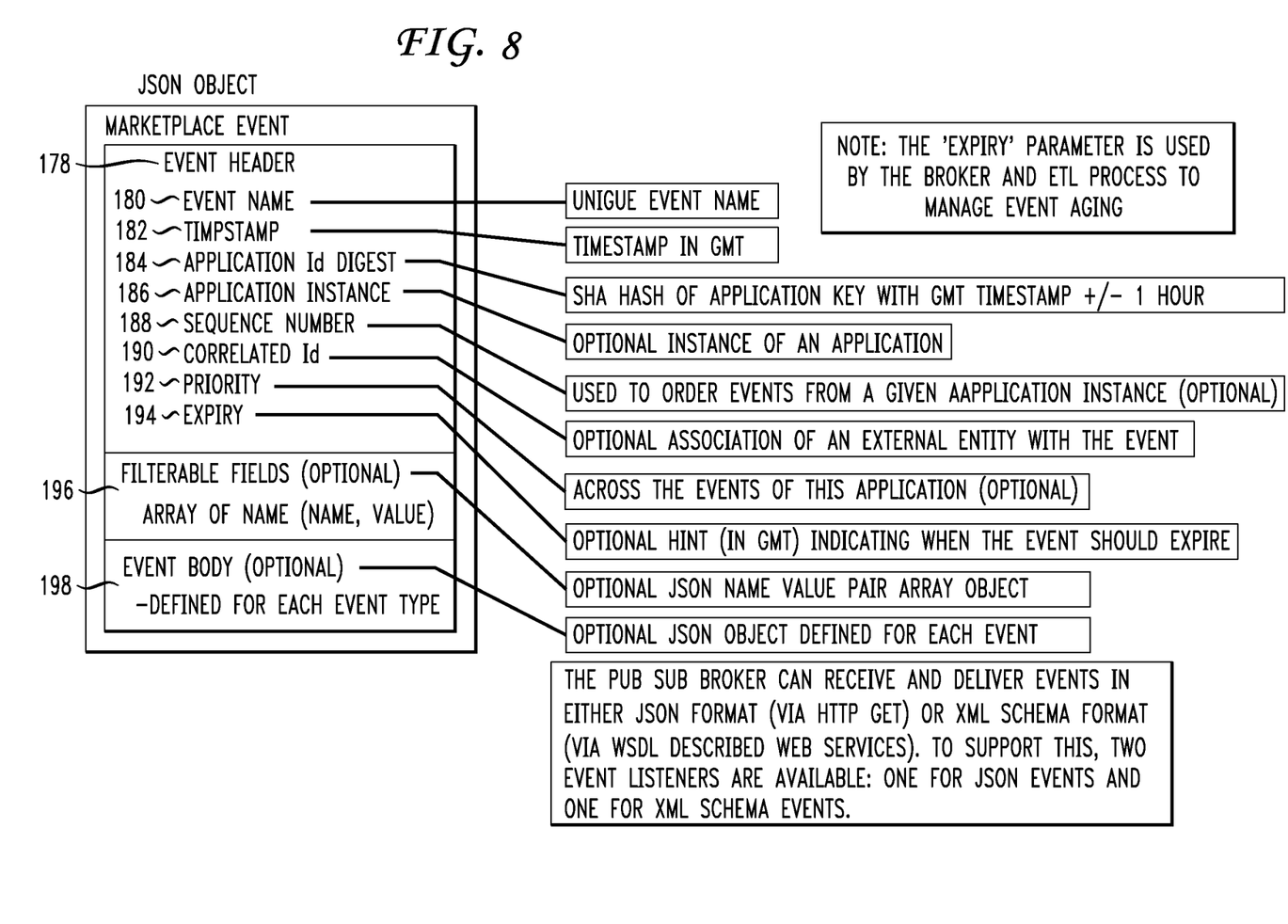
FIG. 8 is a block diagram of a marketplace event structure for JSON events.

Marketplace Events conform to a common event structure, which can be processed by a common interface called a Marketplace Event Listener. Events have three main components as depicted in FIG. 8.

The first component is an Event Header 178. This contains fields common to all events such as the Event Name 180, Timestamp 182, Source Application Identification Digest 184, Application Instance 186, Sequence Numbers 188, Correlated Id 190, Priority 192, and Expiry 194.

The second main component is Filterable Fields 196, and is an optional name value pairs which the PSN Broker can use to filter events. The third component is the Event Body 198 and is an optional String into which a JSON (JavaScript Object Notation) object or XML Schema object is passed.

The PSN Broker can receive events either in JSON format or XML Schema format. Furthermore, it can deliver events to subscribers in either format, according to their event subscriptions. To support this, two Marketplace Event Listeners are available. One that can receive JSON Events, and one that can receive XML Schema Events, as depicted in FIG. 8.

The PSN Broker hosts a Subscription Service which enables event subscribers to create and manage their subscriptions, including the establishment of event filters. The Subscription Service presents a number of operations via a graphical user interface and web services APIs. Chief among these is the subscribe( ) operation, which is described below. Other operations include unsubscribe( ), as well as operations to get and change subscription details.

The subscribe( ) operation enables event subscribers to register their interest in receiving events. Input parameters include:

Event Name: (required) event type name

Event Format: (optional) JSON or XML. Default is JSON.

Event Listener URL (optional): If undefined, events must be pulled (rather than pushed to the subscriber).

Qos: (optional) an array of name-value pairs, each of which has built-in defaults.

Figure 9:
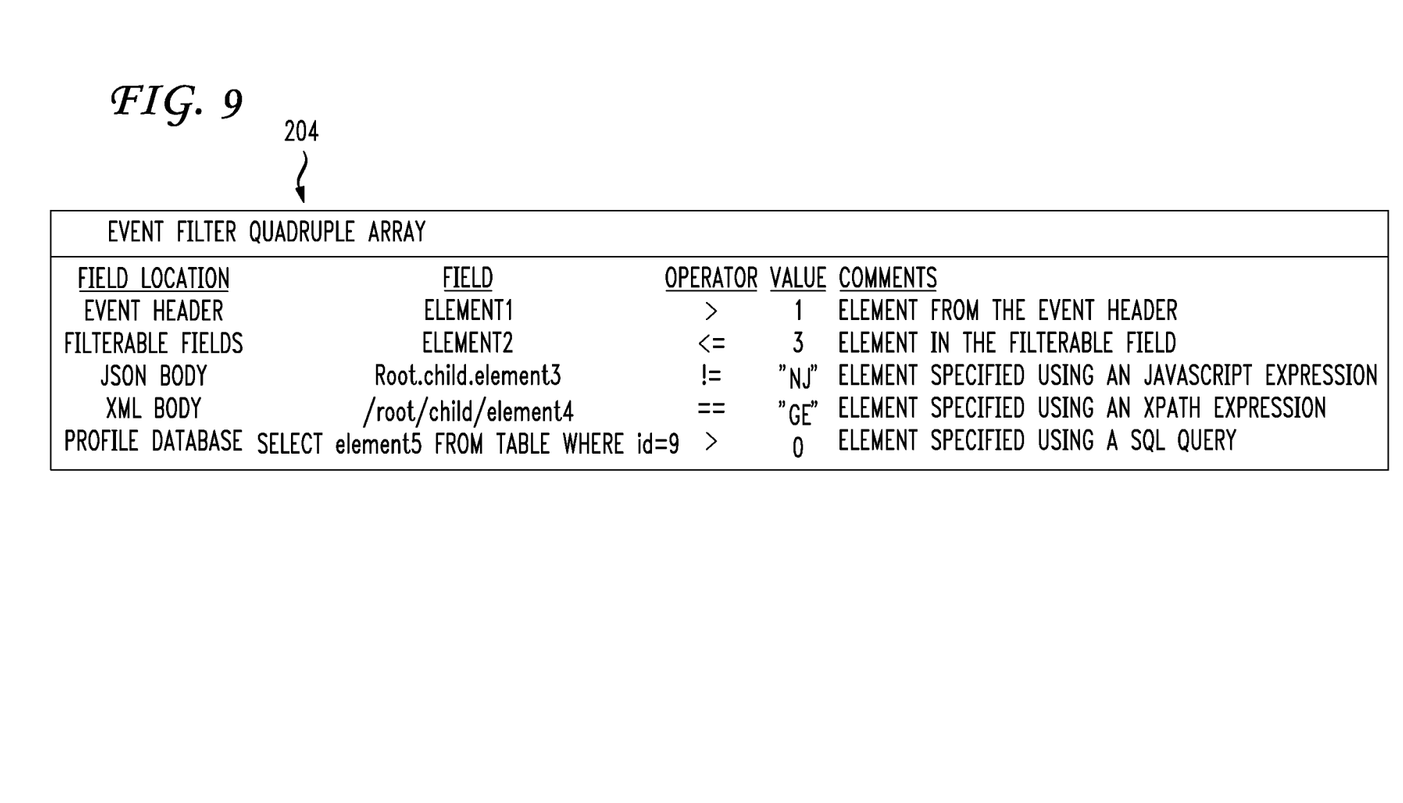
FIG. 9 is an example of an event filter.

Event Filter: (optional) An array of quadruples consisting of a 'field location', 'field', 'operator' and 'value'. Each quadruple constitutes an expression. All expressions are ANDed together. If the result evaluates to FALSE, the PSN broker must not send the event to the subscriber. Default is TRUE. If the PSN broker cannot honor the requested filtering, it must throw an appropriate exception. FIG. 9 provides an example of an Event Filter 204.

QoS policies are established when a subscription is created and may be changed by invoking an appropriate operation (e.g., changeQos( )) on the PSN Subscription Service. Possible QoS names and values are defined below:

EventReliability: Controls whether events should be delivered using persistent or best effort QOS. Possible values are 'persistent' or 'best-effort'. Default is 'best-effort'.

Best-effort: No delivery guarantees are made. The event may or may not be received by each of the subscribers, and a given subscriber may receive the event multiple times.

Persistent: the broker stores events persistently and guarantees their delivery to subscribers, even if the broker crashes, subject to subscription and event expiry limits.

MaximumEvents: Defines the maximum number of events the broker should queue on behalf of the subscriber. Default is 'infinite'.

OrderPolicy: Controls how the broker will queue and deliver events for the subscription. Possible values are 'AnyOrder', 'FIFO', 'LIFO', 'PriorityOrder' or 'ExpiryOrder'. Default is 'AnyOrder'.

AnyOrder: Any ordering policy is permitted.

FIFO: First in, first out: deliver in order received.

LIFO: Last in, first out: deliver the most recent events first.

PriorityOrder: Delivery in priority order.

ExpiryOrder: Delivery in order of event expiry: soonest to expire is delivered first.

DiscardPolicy: Controls how the broker will discard events in the case of internal buffer overflow. Default is 'AnyOrder'.

AnyOrder: Discard in any order.

FIFO: The first in is discarded first.

LIFO: The last in is discarded first.

PriorityOrder: The lowest priority is discarded first.

ExpiryOrder: The shortest expiry time is discarded first.

MaximumBatch: Relevant for subscriptions that receive sequences of events. Indicates the maximum number of events that should be delivered within each sequence. Default is 'infinite'.

PacingInterval: Relevant for subscriptions that receive sequences of events. Indicates the maximum period of time the broker will collect events into a sequence before delivery the sequence to the subscriber. Default is 1 hour.

Potential threats to the PSN and the integrity of the information in the CCD must be identified and mitigated. An example of this is an attempt to put massive amounts of bogus service metadata into the CCD by arbitrary clients. This may temporarily benefit Application Creators associated with the bogus data, but it could impair the integrity of a customer keyword profile and the ad matching based on it. A possible mitigation would require applications to identify themselves by generating an SHA hash of Greenwich Mean Time (GMT) and an assigned application key. Generated keys will be replayable only for a specified duration (e.g., for an hour or less). Application keys should be kept private on application servers and not sent down to clients.

Another example of a possible threat to the PSN is the fabrication of Marketplace Events by trusted applications. This may temporarily generate more ad revenue for the Application Creators associated with the fabricated data, since they will participate in more keyword matches. However, this could hurt the integrity of a customer keyword profile and the ad matching based on it. A possible mitigation is an application of data analytics to look for data anomalies and track them back to their source. Applications and App Creators who misuse the system should be banned.

Figure 10:
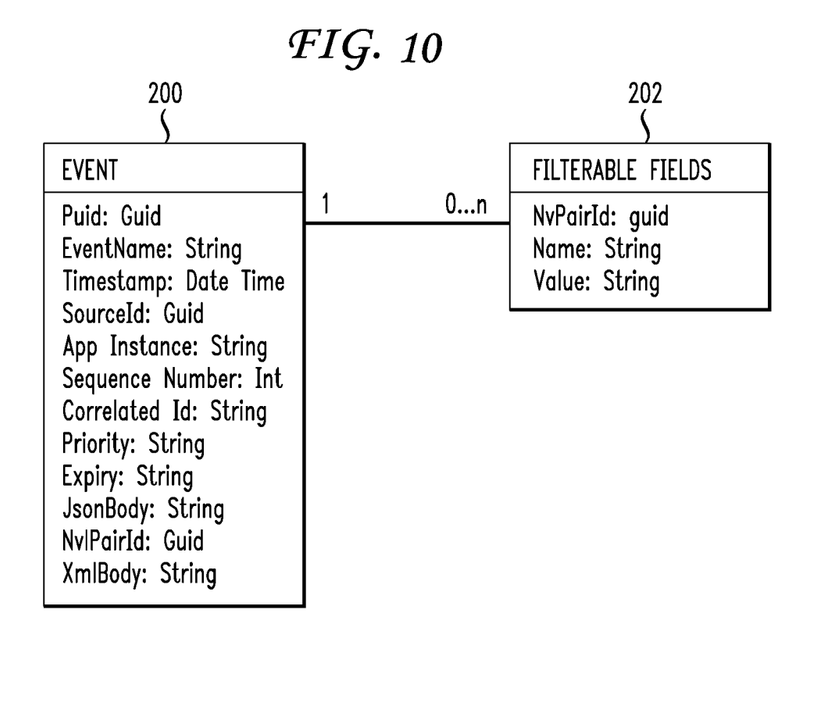
FIG. 10 is a block diagram of the structure of the runtime customer context database.

Data submitted to the PSN via its Submission Interface is persisted in the CCD for a brief period of time, before being swept into the CKD. Data is received as Marketplace Events. These events are persisted in the relational CCD data store. The event data is stored in two tables, the Event table 200 and the Filterable Fields table 202, as depicted in FIG. 10. The Event's Application Id Digest is replaced with a registered Source Id for the Application Creator source generating the event. The Event Body is stored as JsonBody, if a JSON event was sent, or XmlBody, if an XML Schema event was sent. Both JsonBody and XmlBody are strings, just as they are sent in the events themselves. Note: JavaScript provides easy methods to evaluate JSON strings or to convert (i.e., 'stringify') JSON objects into strings. Also, most programming languages support XML Parsing, which is required for them to manipulate the contents of XML strings. The Event Filterable Fields are stored in the Filterable Fields table indexed by a unique NvPairId, which is referenced in the Event table. Note: most Marketplace Events are expected to be very simple and may only require one or two Filterable Fields and no JsonBody or XmlBody.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of sharing access to end user information in a multi-screen environment comprising:

storing end user information associated with an end user and a first screen environment, the first screen environment being associated with a first network access device, the end user information including context information associated with the first screen environment, the end user information stored in an end user context database for use in a second screen environment associated with a second network access device;

providing the context information from the end user context database to the second network access device in response to receiving a request via a telephone application to retrieve a search string and generate a display in the second screen environment based on the context information, the request being initiated on the second network access device subsequent to the end user information being stored in the end user context database, the end user context database comprising a library of registered marketplace events enabling applications to provide the multi-screen environment by facilitating loose coupling with applications executed in the first screen environment, second screen environment, and third screen environment, the end user context database comprising a library of enablers to provide access to reusable network, operational, and business support systems; and providing the end user information to a third party for modification of a third screen environment associated with a third network access device.

2. The method defined by claim 1, wherein the first screen environment comprises a telephone.

3. The method defined by claim 1, further comprising:
generating an event including information associated with the end user in response to use of an application associated with the first screen environment by the end user;
storing the event in the end user context database; and
forwarding the event to other applications serving the end user.

4. The method defined by claim 1, wherein the second screen environment comprises a telephone.

5. The method defined by claim 1, further comprising updating the end user information to represent the request initiated on the second network access device.

6. The method defined by claim 1, wherein the end user information includes information representing preferences associated with the end user.

7. A computer-readable storage medium storing instructions that, when executed by a processor, cause the processor to perform operations comprising:
storing end user information associated with an end user and a first screen environment, the first screen environment being associated with a first network access device, the end user information including context information associated with the first screen environment, the end user information stored in an end user context database for use in a second screen environment associated with a second network access device;

providing the context information from the end user context database to the second network access device in response to receiving a request via a telephone application to retrieve a search string and generate a display based on the context information, the request being initiated on the second network access device subsequent to the end user information being stored in the end user context database, the second screen environment generating the display, the end user context database comprising a library of registered marketplace events enabling applications to provide the multi-screen environment by facilitating loose coupling with applications executed in the first screen environment, second screen environment, and third screen environment, the end user context database comprising a library of enablers to provide access to reusable network, operational, and business support systems; and providing the end user information to a third party for modification of a third screen environment associated with a third network access device.

8. The computer readable storage medium defined by claim 7, wherein the first screen environment comprises a telephone.

9. The computer readable storage medium defined by claim 7, wherein the operations further comprise:
generating an event including information associated with the end user in response to use of an application associated with the first screen environment by the end user
storing the event in the end user context database; and
forwarding the event to other applications serving the end user.

10. The computer readable storage medium defined by claim 7, wherein the second screen environment comprises a telephone.

11. The computer readable storage medium defined by claim 7, wherein the operations further comprising updating the end user information to represent the request initiated on the second network access device.

12. The computer readable storage medium defined by claim 7, wherein the end user information includes information representing preferences of the end user.

13. A system that shares access to end user information in a multi-screen environment comprising:
a computing device; and
a storage device to store instructions that, when executed by the computing device, cause the computing device to perform operations comprising:
storing end user information associated with an end user and a first screen environment, the first screen environment being associated with a first network access device, the end user information including context information associated with the first screen environment, the end user information being stored in an end user context database for use in a second screen environment associated with a second network access device;

providing the context information from the end user context database to the second network access device in response to receiving a request via a telephone application to retrieve a search string and generate a display based on the context information, the request being initiated on the second network access device subsequent to the end user information being stored in the end user context database, the second screen environment generating the display, the end user context database comprising a library of registered marketplace events enabling applications to provide the multi-screen environment by facilitating loose coupling with applications executed in the first screen environment, second screen environment, and third screen environment, the end user context database comprising a library of enablers to provide access to reusable network, operational, and business support systems; and providing the end user information to a third party for modification of a third screen environment associated with a third network access device.

14. The system defined by claim 13, wherein the first screen environment comprises a telephone.

15. The system defined by claim 13, wherein the operations further comprise generating an event including information associated with the end user in response to use of an application associated with the first screen environment by the end user, thereby storing the event to the end user context database and forwarding the event to another third party; and forwarding the event to other applications serving the end user.

16. The system defined by claim 13, wherein the second screen environment comprises a telephone.

17. The system defined by claim 13, wherein the operations further comprise updating the end user information to represent the request initiated on the second network access device.

18. The system defined by claim 13, wherein the end user information includes information representing preferences of the end user.

19. The system defined by claim 14, wherein the first network access device includes a personal computer providing access to the Internet.

20. The system defined by claim 16, wherein the second network access device includes a personal computer providing access to the Internet.

\* \* \* \* \*